United States Patent
Palmer et al.

(10) Patent No.: US 12,466,931 B2
(45) Date of Patent: Nov. 11, 2025

(54) POLYMERIC ARTICLES HAVING DYE SUBLIMATION PRINTED IMAGES AND METHOD TO FORM THEM

(71) Applicant: GreenTech Composites LLC, Livingston, NJ (US)

(72) Inventors: Paul Palmer, Livingston, NJ (US); Anastasia Freitas, Livingston, NJ (US); Stephan Lerman, Livingston, NJ (US)

( * ) Notice: Subject to any disclaimer, the term of this patent is extended or adjusted under 35 U.S.C. 154(b) by 0 days.

(21) Appl. No.: 18/561,046

(22) PCT Filed: May 16, 2022

(86) PCT No.: PCT/US2022/029426
§ 371 (c)(1),
(2) Date: Nov. 15, 2023

(87) PCT Pub. No.: WO2022/245723
PCT Pub. Date: Nov. 24, 2022

(65) Prior Publication Data
US 2024/0191050 A1   Jun. 13, 2024

Related U.S. Application Data

(60) Provisional application No. 63/189,458, filed on May 17, 2021.

(51) Int. Cl.
*C08J 9/36* (2006.01)
*B32B 5/18* (2006.01)
(Continued)

(52) U.S. Cl.
CPC ............... *C08J 9/365* (2013.01); *B32B 5/18* (2013.01); *B32B 27/065* (2013.01);
(Continued)

(58) Field of Classification Search
CPC ... C08J 9/365; C08J 5/043; C08J 7/042; C08J 9/0095; C08J 2205/10; C08J 2207/00;
(Continued)

(56) References Cited

U.S. PATENT DOCUMENTS 1,895,243 A    1/1933   Dort
2,846,408 A    8/1958   Bezirk et al.
(Continued)

FOREIGN PATENT DOCUMENTS

CA    2670225 A1    5/2008
EP    0098506 A2    1/1984
(Continued)

OTHER PUBLICATIONS

International Preliminary Report on Patentability issued in co-pending Application No. PCT/US2022/029426 mailed Nov. 24, 2022 (21 pages).
(Continued)

*Primary Examiner* — Hai Vo
(74) *Attorney, Agent, or Firm* — Young Basile Hanlon & MacFarlane, P.C.

(57) ABSTRACT

An article is comprised of a thermoset polymer having a dye sublimation image in a layer attached or integral to a surface of the thermoset polymer, wherein at least a portion of the thermoset polymer is a foam. The foam article may be made by pretreating a thermoset organic polymer foam to a temperature of 100° C. to about 250° C. for a time sufficient to stabilize the thermoset polymer and dye sublimating an image into a layer of the pretreated thermoset foam. The foam article having the dye sublimation image may be used for applications having aesthetic or structural requirements such as railing, decking or fences.

13 Claims, 2 Drawing Sheets

(51) Int. Cl.
  *B32B 27/06* (2006.01)
  *B41M 5/00* (2006.01)
  *B41M 5/035* (2006.01)
  *C08J 5/04* (2006.01)
  *C08J 7/04* (2020.01)
  *C08J 9/00* (2006.01)

(52) U.S. Cl.
  CPC ........ *B41M 5/0064* (2013.01); *B41M 5/0355* (2013.01); *B41M 5/0358* (2013.01); *C08J 5/043* (2013.01); *C08J 7/042* (2013.01); *C08J 9/0095* (2013.01); *B32B 2262/101* (2013.01); *B32B 2266/02* (2013.01); *C08J 2205/10* (2013.01); *C08J 2207/00* (2013.01); *C08J 2375/04* (2013.01)

(58) Field of Classification Search
  CPC .......................... C08J 2375/04; B41M 5/0064; B41M 5/0355; B41M 5/0358
  See application file for complete search history.

(56) References Cited

U.S. PATENT DOCUMENTS

| | | | |
|---|---|---|---|
| 3,230,995 | A | 1/1966 | Shannon |
| 3,363,557 | A | 1/1968 | Blake |
| 3,508,492 | A | 4/1970 | Krafft et al. |
| 3,544,417 | A | 12/1970 | Corzine |
| 3,632,291 | A | 1/1972 | Defago et al. |
| 3,703,143 | A | 11/1972 | Gaynor |
| 3,829,286 | A | 8/1974 | Anzai et al. |
| 3,877,964 | A | 4/1975 | Orman |
| 3,914,188 | A | 10/1975 | Carroll et al. |
| 3,961,965 | A | 6/1976 | Zwahlen |
| 4,009,995 | A | 3/1977 | Dressler |
| 4,059,471 | A | 11/1977 | Haigh |
| 4,121,897 | A | 10/1978 | Duhnkrack et al. |
| 4,205,136 | A | 5/1980 | Ohashi et al. |
| 4,354,851 | A | 10/1982 | Hix et al. |
| 4,587,155 | A | 5/1986 | Durand |
| 4,664,672 | A | 5/1987 | Krajec et al. |
| 5,064,872 | A | 11/1991 | Monstrey et al. |
| 5,068,280 | A | 11/1991 | Pal et al. |
| 5,462,623 | A | 10/1995 | Day |
| 5,523,273 | A | 6/1996 | McQuaide |
| 5,580,410 | A | 12/1996 | Johnston |
| 5,589,243 | A | 12/1996 | Day |
| 5,674,918 | A | 10/1997 | Bhattacharjee et al. |
| 5,798,160 | A | 8/1998 | Kohn |
| 5,912,729 | A | 6/1999 | Jourdan et al. |
| 6,136,126 | A | 10/2000 | Fenzi |
| 6,199,335 | B1 | 3/2001 | Brenot et al. |
| 6,214,753 | B1 | 4/2001 | Brenot et al. |
| 6,335,749 | B1 | 1/2002 | Carizzoni et al. |
| 6,346,205 | B2 | 2/2002 | Sieker et al. |
| 6,566,033 | B1 | 5/2003 | Majumdar et al. |
| 6,740,381 | B2 | 5/2004 | Day et al. |
| 6,814,831 | B2 | 11/2004 | Drake |
| 6,956,066 | B2 | 10/2005 | Vazquez et al. |
| 6,998,005 | B2 | 2/2006 | Magee et al. |
| 7,033,973 | B2 | 4/2006 | Fenzi |
| 7,879,922 | B2 | 2/2011 | Vazquez |
| 8,182,903 | B2 | 5/2012 | Willham |
| 8,283,290 | B2 | 10/2012 | Langan et al. |
| 8,308,891 | B2 | 11/2012 | Drake et al. |
| 8,461,534 | B1 | 6/2013 | Koltick |
| 8,562,777 | B2 | 10/2013 | Drake |
| 9,091,067 | B2 | 7/2015 | Brewster et al. |
| 9,315,612 | B2 | 4/2016 | Shutov |
| 9,650,466 | B2 | 5/2017 | Shutov |
| 9,946,814 | B1 | 4/2018 | Cox |
| 10,329,397 | B2 | 6/2019 | Shutov |
| 10,583,686 | B1 | 3/2020 | Moalli |
| 2002/0148054 | A1 | 10/2002 | Drake |
| 2003/0019213 | A1 | 1/2003 | Ohta et al. |
| 2003/0192136 | A1 | 10/2003 | Magee et al. |
| 2004/0119189 | A1 | 6/2004 | Helber et al. |
| 2005/0191569 | A1* | 9/2005 | Aylward ................ G03G 7/004 430/18 |
| 2007/0027227 | A1 | 2/2007 | Shutov |
| 2011/0224024 | A1* | 9/2011 | Tutmark .......... A63B 37/00222 473/378 |
| 2013/0251980 | A1 | 9/2013 | Pellacani et al. |
| 2016/0060414 | A1 | 3/2016 | Kenkare et al. |
| 2016/0317354 | A1 | 11/2016 | Weisman et al. |
| 2017/0080296 | A1* | 3/2017 | Sullivan ............. A63B 37/0043 |
| 2018/0163413 | A1* | 6/2018 | Odum .................... B32B 5/024 |
| 2018/0272778 | A1 | 9/2018 | Takahashi et al. |
| 2018/0283014 | A1* | 10/2018 | Hodgkins ............. E04F 15/105 |
| 2020/0115550 | A1 | 4/2020 | Pandolfi |
| 2020/0141053 | A1 | 5/2020 | Arnold et al. |
| 2020/0147996 | A1 | 5/2020 | Moalli |
| 2020/0199886 | A1* | 6/2020 | Van Giel ................ B32B 23/20 |
| 2020/0346483 | A1 | 11/2020 | Moalli |
| 2022/0389722 | A1* | 12/2022 | Van Essche ............. B05D 1/38 |

FOREIGN PATENT DOCUMENTS

| | | |
|---|---|---|
| EP | 0903368 A1 | 3/1999 |
| EP | 3033183 B1 | 10/2018 |
| WO | 199618509 A1 | 6/1996 |
| WO | 200114140 A1 | 3/2001 |
| WO | 2008060918 A1 | 5/2008 |
| WO | 2010011498 A1 | 1/2010 |
| WO | 2010093524 A2 | 8/2010 |
| WO | 2019160421 A1 | 8/2019 |
| WO | 2020005235 A1 | 1/2020 |
| WO | 2020167327 A1 | 8/2020 |
| WO | 2020210700 A1 | 10/2020 |

OTHER PUBLICATIONS

International Search Report and Written Opinion issued in co-pending Application No. PCT/US2022/029426 mailed Aug. 25, 2022 (10 pages).

Office Action Communication issued in co-pending European Application No. EP22727707.6 dated Nov. 25, 2024 (7 pages).

* cited by examiner

POLYMERIC ARTICLES HAVING DYE SUBLIMATION PRINTED IMAGES AND METHOD TO FORM THEM

CROSS-REFERENCE TO RELATED APPLICATIONS

This application is a National Stage 371 entry of PCT/US2022/029426 filed on May 16, 2022, published as WO2022/245723, which claims priority to U.S. Provisional Patent Application No. 63/189,458 filed on May 17, 2021, all of which are incorporated herein by reference in their entirety for all purposes.

FIELD

The invention relates to forming polymeric articles having dye sublimation printed images. In particular, the invention relates to articles comprised of thermoset polymers having attached thereto a dye sublimation image.

BACKGROUND

Over many years in the building construction industry there has been a continuing shift from the use of natural materials (e.g., wood) to metal and engineered wood products for structural applications. Likewise, there has been a similar trend to replace wood for use in functional and aesthetic applications such as siding, fences, deck planking, railing and balustrades exposed to the environment. For example, PVC (polyvinylchloride) and fiber cement siding have become common. Likewise, decking and railing have become available for decking and railing such as those available under the tradename TREX, which are composite plastic materials coextruded with an embossed plastic cap layer. Even though these materials have some advantages compared to wood, they tend to be expensive and display disadvantages compared to wood. They also may require specialized installation hardware (e.g., may suffer from screw tear out due to excessive thermal expansion and grab). For example, they are aesthetically not as appealing and tend to suffer from heat buildup and heat transfer under bright sunlight making them uncomfortable in warmer climates. In addition, they tend to be heavy, and somewhat flexible precluding their use in a structural capacity due to low bending strength.

More recently in the commercial building industry, metal panels having dye sublimation printed (DSP) images thereon have been used to form large panels for use in large panels for use in doors, windows and cladding such as described in U.S. Pat. Nos. 6,136,126 and 6,335,749. The DSP process, typically, requires elevated temperatures of ~170 to 200° C. and significant compressive forces, which have essentially precluded plastic substrates having DSP images thereon use in forming construction materials. Because of the expense of the process and material constraints, metal substrates having DSP images thereon have tended to be limited to commercial buildings with their longer life requirements.

It would be desirable to provide a more cost effective, aesthetically appealing synthetic construction material that has improved properties, weathering, weight and comfort and method to produce such construction material.

SUMMARY

Applicants have discovered that thermoset polymers may be dye sublimation printed (DSP) to form useful articles. In particular, it has been discovered that polymeric thermoset foams may be printed directly, dye sublimation printed, or dye sublimation printed using one or more layers to form a foam article having attached thereto a DSP image. The DSP image, because it penetrates and diffuses into the foam or layer attached or adhered to the foam creates a long-lasting wear surface that enables it to be aesthetically appealing even after long exposure to the environment and use. Surprisingly the method may be performed at temperatures using thermoset polymers that typically degrade at such temperatures in air.

A first aspect of the invention is an article comprised of a thermoset polymer having a dye sublimation image in a layer attached or integral to a surface of the thermoset polymer, wherein at least a portion of the thermoset is a foam. It has been surprisingly discovered that a thermoset polymer may be dye sublimation printed even at temperatures that normally would typically degrade the thermoset polymer if properly pre-treated.

A second aspect of the invention is a method of forming an article comprising, pretreating an initial article comprised of a thermoset organic polymer by heating to a pretreatment temperature of about 100° C. to about 250° C. for a time sufficient to stabilize the thermoset polymer and dye sublimating an image into the initial article to form an article having a dye sublimation image a layer attached or integral to a surface of the thermoset polymer and at least a portion of the thermoset is a foam.

DETAILED DESCRIPTION

The explanations and illustrations presented herein are intended to acquaint others skilled in the art with the invention, its principles, and its practical application. The specific embodiments of the present disclosure as set forth are not intended to be exhaustive or limit the scope of the disclosure.

One or more as used herein means that at least one, or more than one, of the recited components may be used as disclosed. It is understood that the functionality of any ingredient or component may be an average functionality due to imperfections in raw materials, incomplete conversion of the reactants and formation of by-products.

The article is comprised of a thermoset polymer having a dye sublimation image in a layer attached or integral to a surface of the thermoset polymer, wherein at least a portion of the thermoset is a foam. The thermoset may be any suitable thermoset such as those known in the art. Illustratively, the thermoset may be comprised of one or more cross-linked polymers such as polyester, polyurethane, polyisocyanurate, polyurea, polyurea/polyurethane, phenol-formaldehyde, urea-formaldehyde, melamine, diallyl-phthalate, epoxy, epoxy-novolac, benzoxazine, polyimide, bismaleimide, cyanate ester, furan resin, or silicone. Desirably, the thermoset is polyurethane, polyisocyanurate, polyurea or combination thereof.

Figure 1:
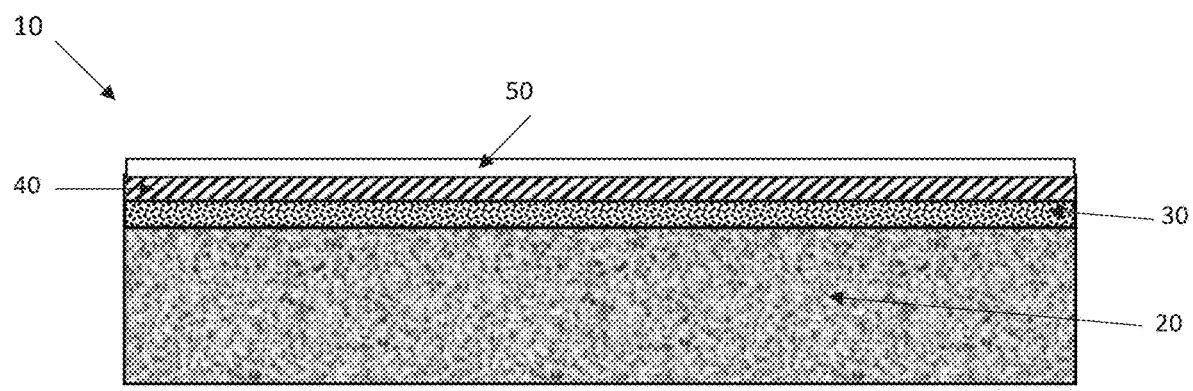
FIG. 1 is an is cross-sectional illustration of an article of this invention.

FIG. 1 is an illustration of one embodiment of the invention where the article 10 is comprised of a thermoset polymer foam 20 that has an abutment layer 30, image accepting layer 40 sandwiched between the abutment layer

30 and cap layer 50. The image accepting layer having therein the dye sublimation image in at least a portion of the thickness of said layer, which is further described below.

At least a portion of the thermoset polymer is a foam. A foam, as commonly understood in the art, means a body that is cellular. Cellular (foam) herein means the polymer body has a substantially lowered apparent density compared to the density of the polymer without any pores and the body is comprised of cells that are closed or open. Closed cell means that the gas within that cell is isolated from another cell by the polymer walls forming the cell. Open cell means that the gas in that cell is not so restricted and is able to flow to another cell without passing through any polymer cell walls to the atmosphere. The thermoset may entirely be a foam, but may be in many instances be comprised of a skin that is dense thermoset such is common when making polyurethane foams when desired. The foam portion may be uniform or have one or more gradients of porosity (e.g., a more porous interior and denser surface). Generally, at least about 10%, 20%, 50%, 75% to 99%, 95% or 90% of the thermoset is a foam. The skin may be any useful thickness. Generally, the skin thickness or accepting layer 40 may be from about 10 micrometers, 100 micrometers or 500 micrometers to about 5 mm, 2 or 1 mm. The skin may encapsulate any portion of the thermoset polymer foam including encapsulating the entire foam. Typically, the skin, when present covers at least 50%, 75% 90%, or essentially the entire surface of the foam.

It may be useful for the thermoset polymer to have a layer adhered to a portion or all of the foam thermoset polymer, for example, to facilitate the formation of the dye sublimation image (e.g., image accepting layer 40), provide a base color coat, or provide some other property (e.g., smooth the surface of open cells on the surface of the foam surface). The image accepting layer 40 may be a thermoplastic or thermoset polymer. The image accepting 40 layer may be of similar chemistry such as a polyurethane foam coated with a polyurethane film of a difference coating chemistry, which may be useful for forming particular desired properties of the dye sublimated image formed within the coating (e.g., wear and scratch resistance, UV resistance and the like). Exemplary films or coatings may include any films, coating or layers suitable for accepting and forming dye sublimation images such as those known in the art. Generally, such coatings or layers may include a thermoset or thermoplastic polymer having one or more polar groups such as a condensation polymer. Exemplary coatings or layers include polyurethane (e.g., oil or water dispersed dispersions of polyurethane, polyurea or polyisocyanurate particulates that coalesce upon removal of the liquid dispersion medium forming a somewhat uniform pore free coating), epoxies, acrylics/acrylates, alkyds, polyamine, polyamide, fluoropolymers, polyvinylfluoride, polybutylene terephthalate, polyesters (e.g., polyethylene terephthalate), polycarbonates, polystyrene and polystyrene copolymers (ABS, "acrylonitrile butadiene styrene" and the like) mixtures or combinations thereof. The image accepting layer may be smooth or have intentional embossing or waviness imparted thereto for aesthetics or to improve traction such as on a deck surface.

Examples of polymers useful for the image accepting layer 40 may also include a two-part acrylic-aliphatic urethane coatings available under the trade name PITTHANE, HPC High Gloss Epoxy, PPG flooring concrete epoxy primer, each from PPG Industries. An example of a thermoplastic polymer that may be useful include an acrylic-polyvinylchloride copolymer available under the tradename KYDEX, available from SEKISU KYDEX, Holland MI, a polycarbonate under the trade name LEXAN and a polyetherimide under the trade name ULTEM from Sabic, Pittsfield, MA and polyamide available under the tradename NYLENE from Nylene Polymer Solutions, RILSAN from Arkema, and various grades from UBE America Inc., Livonia, MI. Other thermoplastic polymers that may be useful for the image accepting layer include, for example, polyamide, polyimide, polyamideimide, polyester, polyetherester, thermoplastic polyurethane, polyacrylate, polyacrylic acid, functionalized polyolefin (e.g., maleic anhydride grafted polyethylene) or mixture or combination of any of the aforementioned.

The thermoset foam 20 may have an undercoat layer (abutment or abutting layer 30) that is sandwiched between the thermoset foam and image accepting layer that provides one or more desired properties such as thermal resistance to facilitate the formation of the dye sublimated image attached or integral to the thermoset foam. For example, the undercoat layer may be any useful coating that is resistant to heat or that absorbs heat that may assist the formation of the dye sublimation image without distorting or degrading the properties of the thermoset foam. The high temperature resistant coating may be any suitable high temperature coating such as those known in the art and typically have a higher use temperature (e.g., melt or degrade at a temperature above that of the thermoset polymer foam). Commonly these coatings have a high concentration of metal or inorganic particulates that provide for thermal resistance, heat insulation or heat absorption or may be a high temperature foam (e.g., inorganic siliceous foam). Examples of heat resistance coatings that may be useful include those available from PPG under the tradenames PPG HI-TEMP, AMERCOAT, AMERLOCK, DIMETCOTE, PSX, and SIGMATHERM. These coatings, in some instances, may also be used as the layer that accepts the dye sublimation image as described above. The undercoat may be any useful thickness such as those thicknesses described for the image accepting layer 40.

The thermoset foam 30 may have a cap layer 50 that is on top of the image accepting layer, which may be clear coat or have a matte finish. The clear or opaque coating may be smooth, textured or embossed. The texturing or embossing may be an desired such as wood grain, stone, tile, brick or other masonry motif. The cap layer 50 may be any useful thickness such as described for the image accepting layer. Exemplary polymers that may be useful for such cap layers include those described above for the image accepting layer.

The thermoset foam 30 may have any amount of open or closed cells. Even so, the cells may be advantageously closed, for example, to provide for improved insulation such as for siding or rigidity. The amount of closed cells may vary from essentially zero to essentially all closed cells. Generally, the amount of closed cells is less than 95%, 90% 75%, to 5%, 10% or 25%. The amount of closed or cell size may be determined by ASTM D 2856.

The cell size may be any useful size to make the article 10 and may depend on the particular article and its use. Illustratively, the foam may be microcellular to a cell size on the order of millimeters or even larger. Desirably, the average cell size is at from about 1 micrometer, 10, micrometers, 100 micrometers, 250 micrometers, 500 micrometers to about 10 mm, 5 mm or 2 mm. The porosity may be any shape or morphology, such as elliptical or spherical. The shape desired may be induced by mechanical agitation such as shear to elongate the cells to realize anisotropic properties if desired. The average cell size may be determined as described in U.S. Pat. No. 5,912,729 and known image analysis techniques of micrographs of cross-sections of the foam, which may also be used to determine gradient structures.

The thermoset polymer may be rigid or flexible, but generally it is desirable for the thermoset foam to be rigid. Rigid herein means that thermoset does not distort under its own weight or under the typical pressures used to form a dye sublimation image on the thermoset. Desirably, the thermoset has an elastic modulus (i.e., modulus of elasticity) of at least about 5,000 pounds per square inch (psi), 10,000 psi, 50,000 psi, 100,000 psi, 200,000 psi to about 1,000,000 psi or 500,000 psi.

The thermoset polymer may also be comprised of a reinforcing agent or component to realize the desired mechanical properties that may be isotropic or anisotropic. The reinforcement may also be desirable to facilitate the thermoset's ability to withstand the conditions necessary to form the dye sublimation image. The reinforcing component may be any suitable reinforcing component that enhances or realizes a desired properties such as stiffness, thermal conductivity, strength, heat resistance or the like. The reinforcing component may be any suitable reinforcing component such as those known to be useful in organic polymers. Illustratively, the reinforcing component may be a metal, ceramic or other organic polymer (e.g., polymeric fiber such as an engineering plastic fiber). The reinforcing component may be an inorganic compound. The reinforcing component may be a particles, fibers, sheets, honeycombs, rods, or combination thereof. The sheets may be woven or unwoven fibrous fabrics or sheets. Desirably the reinforcement component is a fiber, particle or combination thereof.

The reinforcement component when it is a fiber may be any useful fiber such as an inorganic glass fiber, engineering plastic fiber (e.g., polyamide, polyimide, polycarbonate or the like), carbon fiber, natural or plant based fiber, metal fiber or wire or combination thereof including for example organic polymer coated metal, carbon or inorganic glass fibers. The fibers may be long or chopped fibers. Long fibers generally meaning the fibers transverse a substantial distance of one or more dimensions of the thermoset or article (generally a long fiber is at least about 5 or 10 mm and chopped fibers are less than this length). Typically, the fiber or wire may have any useful cross-sectional shape such as square, rectangular, ovoid, spherical or other polygon shapes (e.g., hexagon, parallelogram, triangle and the like). Typically, the average diameter of the fiber is between 1 micrometer, 5 micrometers, 10 micrometers or 20 micrometers to about 2 mm, 1 mm, 0.5 mm, 250 micrometers, or 100 micrometers. The fiber desirably is an inorganic fiber such as those known in the art. Illustratively, the inorganic fiber may be any E, A, C, ECR, R, S, D or NE glass fibers such as those available from Owen-Corning.

When the reinforcement component is a particulate, the particulate may be any suitable particle such as those known in the art. Illustratively, the particulate may be a ceramic, organic (e.g., plant derived such as a cellulosic particle of flour) metal or carbon particulate (e.g., carbon black, carbon nanotubes, graphite). Examples of particulates that may be suitable include inorganic particulates such as clay, talc, wollastonite, mica, coal ash, calcium carbonate, mono metal oxides (e.g., silica, calcium oxide, titania, alumina, zirconia, or magnesia) or mixed metal oxides (e.g., alumino silicates), nitrides (silicon nitride, aluminum nitiride), carbides (e.g. silicon carbide or boron carbide) or any combination (e.g., oxy-carbide or oxy nitride) or mixture thereof.

The reinforcing component may be present in any useful amount to realize the desired properties or facilitate the ability to withstand the dye sublimation image formation conditions. The amount of reinforcement component may be from about 1%, 2%, 5%, 10%, 20%, 30%, 40%, 50% to about 80%, 70%, or 60% by weight of the thermoset or article. The reinforcement component may be uniformly distributed throughout the thermoset or vary within or on the thermoset. For example, the reinforcement component may be distributed on the surface such as fibrous fabric sheets and the like. Examples of such reinforcement are further described in U.S. Pat. Nos. 3,230,995; 3,544,417; 5,462,623; 5,589,243; 5,798,160; 6,740,381; and 9,091,067 each incorporated herein by reference. Foamed thermoset for use in the invention may include foamed composite boards available from General Plastics Manufacturing Company (Tacoma, WA) under the tradename LAST-A-FOAM; and glass fiber reinforced composite rigid polyurethane foam boards available from Coosa Composites (Pelham, AL) and Kayco Composites LLC., Grand Prairie, TX.

The particulate reinforcement component may be isotropic and/or anisotropic. The particulate reinforcement component may spherical or angular (such as that formed when comminuting a ceramic). The particulate reinforcement component may have an acicular morphology wherein the aspect ratio is at least 2 to 50, wherein the acicularity means herein that the morphology may be needlelike or platy. Needlelike meaning that there are two smaller equivalent dimensions (typically referred to as height and width) and one larger dimensions (typically the length or width). Platy meaning that there are two larger somewhat equivalent dimensions (typically width and length) and one smaller dimension (typically height). More preferably the aspect ratio is at least 3, 4 or 5 to 25, 20 or 15. The average aspect ratio is determined by micrographic techniques measuring the longest and shortest dimension of a random representative sample of the particles (e.g., 100 to 200 particles).

The particulate size reinforcement component needs to be a useful size that is not too large (e.g., spans the smallest dimension of a desired article) and not too small that the desired effects on properties is not realized. In defining a useful size, the particle size and size distribution is given by the median size (D50), D10, D90 and a maximum size limitation. The size is the equivalent spherical diameter by volume as measured by a laser light scattering method (Rayleigh or Mie with Mie scattering being preferred) using dispersions of the solids in liquids at low solids loading. D10 is the size where 10% of the particles have a smaller size, D50 (median) is the size where 50% of the particles have a smaller size and D90 is the size where 90% of the particles have a smaller size by volume. The size of the particulates within the thermoset may also be determined by known micrographic techniques. Generally, the filler has an equivalent spherical diameter median (D50) particle size of 0.1 micrometer to 25 micrometers, D10 of 0.05 to 5 micrometers, D90 of 20 to 40 micrometers and essentially no particles greater than about 70 micrometers or even 50 micrometers and no particles smaller than about 0.01 micrometers. Desirably, the median is 5 to 10 micrometers, the D10 is 0.5 to 2 micrometers and the D90 is 20 to 30 micrometers. Likewise, the reinforcement particulates desirably have a specific surface area from 0.1 $m^2/g$ to 20 $m^2/g$ and preferably from 2 $m^2/g$ to 10 $m^2/g$, which may be determined by known standard methods such as nitrogen absorption typically referred to as BET nitrogen absorption.

The thermoset polymer may be a polyurethane, polyisocyanurate, polyurea or combination thereof rigid foam such as those known in the art. Illustrations of such rigid foams are described by EP0903368 and U.S. Pat. Nos. 2,846,408;

3,914,188; 4,205,136; 5,064,872 5,674,918; 6,346,205; 9,650,466 and US Pat. Appl. No. 2013/0251980 each incorporated herein by reference. Useful polyurethane and polyisocyanurate rigid foams may include those available from Foam Products Corporation, St. Louis, MO. Examples of other useful foams include for example polyimide foams such as described by U.S. Pat. No. 6,956,066 and PVC-methacrylate cross-linked foams such as described in U.S. Pat. No. 7,879,922, each incorporated herein by reference.

The dye sublimation image attached or integral to the thermoset foam polymer of the article may be any useful depth such as the entire thickness of the image accepting layer 40 or skin described above. Likewise, if the image is formed directing on and into the thermoset polymer foam with or without a skin the image depth may be any useful depth and may be equivalent to that described for the thickness of the image accepting layer above.

Because of the discovery that a thermoset foam may be used to form a dye sublimated image attached thereto or integrally formed therein, the article may have tunable thermal conductivity so as to realize improved comfort and heating in sunny environments more akin to wood decking as compared to commercial plastic composite decking. For example, the article may have a thermal conductivity that is at most about 1 W/mk, 0.5 W/mK, 0.25 W/mk, 0.1 W/mK to 0.001 W/mK according to ASTM C518-15.

The article may also have tunable and desirable structural or heat insulative properties due to the ability to incorporate differing reinforcement components isometrically or anisometrically and varying of the type of thermoset and thermoset foam and density of the foam and morphological structure of the foam. This allows for the article to be tuned for differing uses. For example, the bending strength of the article may vary from 250 psi or 500 psi to 10,000 psi or 20,000 psi according to ASTM-D143 and the article density may vary over a large useful range for construction applications with a particular advantage being light weight compared to composite plastic boards. For example, the article may have a density of 0.01 g/cc, 0.1 g/cc to about 1.5 g/cc, 1.2 g/cc, 1 g/cc, 0.9 g/cc, 0.75 g/cc or 0.5 g/cc apparent density. The density may be determined by determining the dimensional volume and weight or by use of Archimedes' principle.

Illustratively, the dye sublimation image may be formed by any suitable dye sublimation method such as those known in the art. In many instances, it has been discovered to realize desirable clarity of the image and avoid bubbling and pin pricks of the dye sublimation image, the thermoset polymer in which at least a portion is a foam ("thermoset foam") is heat-treated prior to forming the dye sublimation image. The temperature desirably is to a temperature that stabilizes the image accepting layer 40, which may be an integral skin or coated onto the thermoset polymer foam as described above. Such stabilizing temperature typically is a temperature where the image accepting layer 40 when exposed to the dye sublimation conditions does not bubble, degrade or mar the image to be formed. Typically, the stabilizing temperature is within 25° C., 20° C., 10° C. of the temperature to form the dye sublimation image, which commonly is from about 150° C. or 170° C. to about 200° C. or 225° C. Desirably the stabilizing temperature is above the dye sublimation temperature.

The time at the stabilizing temperature may be any sufficient to stabilize the image accepting layer as described above. The time may be, for example, from 1 or 2 minutes to 1 or 2 hours. The atmosphere may be any useful atmosphere such as air or inert atmosphere at any useful pressure including atmospheric pressure or vacuum.

If separate layers are desired to be adhered or attached to the thermoset foam when forming the article, such layers may be attached or adhered to the thermoset polymer by any suitable method. For example, the abutment layer 30 and image accepting layer may be formed by laminating a film thereto, coated by brushing, spraying, doctor blading, silk screening, or the like. Illustratively, the layer may be formed by coating the thermoset polymer foam with an emulsion, liquid polymer, or dispersion in one part or two parts (reactive coating) and cured on the thermoset foam. The curing may be merely allowing the film to coalesce and form a contiguous film or allow a two-part system to react and cure into a layer on the thermoset foam. Once the layer has cured or liquid medium evaporated or removed, the layer and thermoset polymer foam may be stabilized as described above.

The dye sublimation image may be formed by any suitable method or apparatus such as those known in the art. Examples include methods and apparatus described in Intl. Pat. Appl. No. WO2020210700, U.S. Pat. Nos. 4,059,471; 4,664,672; 5,580,410; 6,335,749; 6,814,831; 7,033,973; 8,182,903; 8,283,290; 8,308,891; 8,561,534; 8,562,777; 9,956,814; and 10,583,686, US Pat. Appl. Nos. 2002/148054; 2003/019213; and 2020/0346483, and Canadian Pat. No. 2,670,225, each incorporated herein by reference. The method may employ any suitable dye sublimation ink such as those known in the art. Examples of dye sublimation inks include those described in U.S. Pat. Nos. 3,508,492; 3,632,291; 3,703,143; 3,829,286; 3,877,964; 3,961,965; 4,121,897; 4,354,851; 4,587,155, EP Pat. No. 0098506, and Intl. Pat. Appl. WO2018208521 each incorporated herein by reference. Likewise, the transfer sheet may be any suitable transfer sheet such as those known in the art and as described in the references cited in this paragraph. Generally, paper transfer sheets as commonly used may be employed.

The dye sublimating generally is performed at a dye sublimating temperature of about 150° C. or 170° C. to about 200° C. or 225° C. for a dye sublimating time sufficient to migrate and be incorporated in the imaging accepting layer to the desired depth and may vary depending on the application (e.g., desired depth to realize a desired wear life). Typically, the dye sublimating time is from 30 seconds, 1 minute, 2 minutes or 5 minutes to about 30 minutes, 20 minutes or about 15 minutes. The pressure may be any useful pressure to effectively transfer the image in the time and detail desired without distorting and compacting the thermoset polymer foam. Generally, it is desirable for the pressure to be as minimal as possible and as uniformly applied to realize a uniform and consistent dye sublimated image in the layer attached or integral to the thermoset polymer foam. The pressure may be applied uniaxially or isometrically. The pressure may be applied by use of a vacuum press, which may be augmented by applying external gas pressure above atmospheric pressure. The pressure may be from about 1, 2, 5 psi to about 300, 150, 100, 50, 20, or 15 psi.

The method surprisingly may use thermoset polymer foams that have degradation temperatures around (e.g., within about 10° C.) where the dye sublimating is performed. In an embodiment, the thermoset polymer foam may be a polyurethane foam with closed or open cells as described above and the foam has a reinforcement component that scavenges water or is cementitious. Cementitious meaning particles that set or form bonds through hydration or carbonation. Examples of useful reinforcement components include Portland cement, coal ash, lime, slaked lime, lime mortar, magnesia, clay minerals (kaolinite, montmorillonite, vermiculite, dickite, halloysite, attapulgite and the like), silica gel or mixture thereof. For example, the loadings may be at least about 30%, 40% or 50% to about 90%, 85% or 80% by weight of the reinforcement and the foam and the size and morphology may be as described above. Without being limiting in any way, it is believed these type of reinforcements aid in maintaining the structural integrity of the foam at the dye sublimating conditions and may also beneficially adsorb or absorb any decomposition products of the foam that may enhance a secondary structure facilitating the retention of the mechanical integrity of the thermoset foam and avoiding marring of the dye sublimating image.

The article of this invention may be used in any application wherein an aesthetically appealing article is desired that is exposed to weathering whether by abrasive wear, rain (e.g., acid rain) or exposure to electromagnetic radiation such as from the sun. Applications where the article of this invention is particularly useful include those traditionally employing natural wood. For example, the article may be a board, siding shingle, door, decking, roofing shingle, fence post, railing, balustrade, paneling, furniture, fascia board, handle or frame.

ILLUSTRATIVE EMBODIMENTS

The following examples are provided to illustrate the articles and methods to form them, but are not intended to limit the scope thereof. All parts and percentages are by weight unless otherwise noted. Table 1 shows the ingredients used in the examples and comparative examples.

Example 1

A polyurethane rigid foam akin to the rigid foam examples described in U.S. Pat. No. 9,956,814 having greater than about 50% by weight fly ash reinforcement component is sanded exposing the foam cells and smoothing the surface. A layer is formed on the surface of the polyurethane foam by coating the surface with an aqueous polyurea dispersion available under the trade name 5500 Aliphatic Polyaspartic Polyurea from ASTC Polymers, Santa Ana, California. The coating forms a uniform layer (image accepting layer) having a thickness of about 250 micrometers. The coated polyurethane foam is pretreated to about 200° C. for about 10-20 minutes in air to further cure the coating and pretreat the polyurethane foam.

A dye sublimation image transfer sheet is formed by printing an image onto paper Jetcol HTR 1000 from Neenah Coldenhove Performance Materials, Eerbeek, Netherlands, using dye sublimation inks obtained from Sawgrass Technologies, Mount Pleasant, South Carolina.

The thermal transfer sheet with the image is placed upon the coated pretreated polyurethane foam. The image is transferred by heating to about 200° C. and uniaxially pressing at a pressure of about 10 to 40 psi for about one half to two minutes using a Hotronix heat press, Carmichaels, PA. The image transfers with good clarity and no marring in the layer having the dye sublimation image. The dye sublimation image penetrates essentially the entire thickness of the image accepting layer.

Example 2

A rigid polyurethane nautical panel having density ranging from 20 to 26 pounds per cubic foot available from Polyumac, USA, Hialeah FL. A layer, pretreatment and dye sublimation image is formed in the same manner as Example 1. The image transfers with good clarity and no marring in the layer having the dye sublimation image. The dye sublimation image penetrates essentially the entire thickness of the image accepting layer.

Example 3

Figure 2:
FIG. 2 is a perspective picture of an example of the invention.

The same rigid polyurethane foam as in Example 2 is prepared in the same manner. The sanded polyurethane foam is pretreated in air to a pretreatment temperature of about 180-200° C. for about 10-20 minutes. An industrial polyurethane powder image accepting layer is deposited on the sanded polyurethane foam and cured at curing temperature of 175-200° C. A dye sublimation image is formed using a vacuum press at a temperature 175-200° C. for 1-10 minutes in a similar manner described by U.S. Pat. No. 7,033,973. The transferred image transfers with good clarity and no marring in the dye sublimation image. The dye sublimation image penetrates essentially the entire thickness of the image accepting layer and examples of the articles formed thereby are shown in FIG. 2.

Comparative Example 1

Example 3 is repeated except that no pre-treatment of the foam is performed. The transferred image is marred and displays bubbling pin pricks and the like. The dye sublimation image penetrates essentially the entire thickness of the image accepting layer.

What is claimed is:

1. An article comprised of a rigid thermoset polymer foam comprised of a thermoset polymer having a uniform and consistent dye sublimation image in an image accepting layer that is at least partially directly attached or integral to a surface of the rigid thermoset foam, wherein the thermoset foam has a porosity that is essentially the same before and after dye sublimating to form the image accepting layer and the rigid thermoset polymer foam, wherein at least 50% of the article by weight is the rigid thermoset polymer foam, wherein the rigid thermoset foam has an elastic modulus of at least 5000-psi before and after dye sublimation is performed while the image accepting layer is directly attached or integral with the rigid thermoset polymer foam, and wherein the rigid thermoset polymer foam has a degradation temperature that is within about 10 degrees Celsius where the dye sublimation was performed.

2. The article of claim 1, wherein the thermoset polymer is comprised of one or more cross-linked polymers: polyester, polyurethane, polyisocyanurate, polyurea, polyurea/polyurethane, phenol-formaldehyde, urea-formaldehyde, melamine, diallyl-phthalate, epoxy, epoxy-novolac, benzoxazine, polyimide, bismaleimide, cyanate ester, furan resin, silicone or mixture thereof.

3. The article of claim 1, wherein the thermoset polymer is comprised of a reinforcing component, wherein the reinforcing component is comprised of any one of particles, fiber, honeycomb, rod or sheet, comprised of an inorganic compound.

4. The article of claim 3, wherein the reinforcement is comprised of at least one of particles, fiber and sheet.

5. The article of claim 1, wherein rigid thermoset polymer foam is a foam without a skin, and
wherein the dye sublimation layer adhered to the thermoset polymer is comprised of a different material than the rigid thermoset polymer foam, wherein the different material may be a ceramic, organic polymer, metal, or mixture or composite thereof.

6. The article of claim 5, wherein a cap layer encapsulates at least a portion of the image accepting layer, and wherein the cap layer is comprised of a thermoplastic organic polymer or thermoset organic polymer.

7. The article of claim 6, wherein the image accepting layer or cap layer has texturing that is in the form of wood grain, stone, brick or tile.

8. The article of claim 6, wherein the thermoplastic organic polymer is a polymer comprised of one or more polar groups.

9. The article of claim 1, wherein the dye sublimation image has a depth of about 10 micrometers to about 5 mm;
wherein the article has a thermal conductivity that is at most about 1 W/mK according to ASTM C518-15;
wherein the article has a bending strength of about 250 psi to 20,000 psi according to ASTM D143;
wherein the article has and an apparent density of at most about 1.5 g/cc; and
wherein the article has a modulus of elasticity of 100,000 to 2,000,000 psi.

10. The article of claim 1, wherein the rigid thermoset foam has an elastic modulus of at least 50,000 psi.

11. An article comprised of a rigid thermoset polymer foam having a uniform and consistent dye sublimation image in an image accepting layer directly attached or integral to a surface of the rigid thermoset polymer foam, wherein the thermoset foam has a porosity that is essentially the same before and after dye sublimating to form the image accepting layer and the rigid thermoset polymer foam, wherein the rigid thermoset polymer foam has an elastic modulus of 10,000 pounds per square inch or more before and after dye sublimation is performed while the image accepting layer is directly attached or integral with the rigid thermoset polymer foam, wherein about 50 percent or more by weight based on the total weight of the article is the rigid thermoset polymer foam, and wherein the rigid thermoset polymer foam has a degradation temperature that is within about 10 degrees Celsius where the dye sublimation was performed.

12. The article of claim 11, wherein the rigid thermoset polymer foam has a bending strength of at least 250 psi.

13. The article of claim 11, wherein the article has an apparent density of at most about 1 g/cc.

* * * * *